Nov. 5, 1946.   R. HARTE   2,410,784
METHOD OF MAKING TOOL BLADES
Filed Jan. 14, 1944
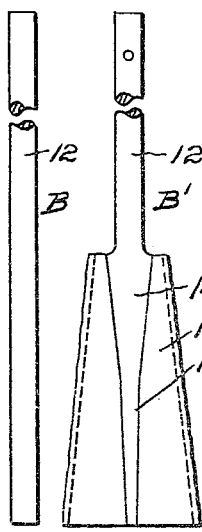
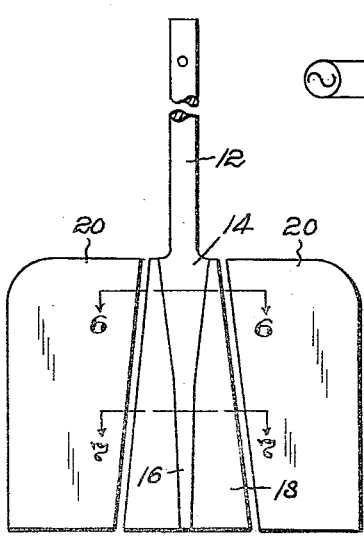
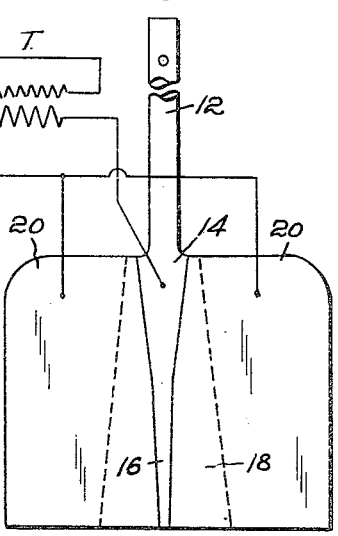
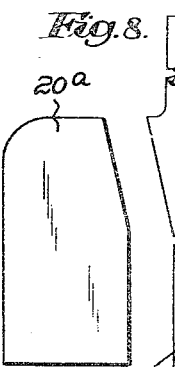
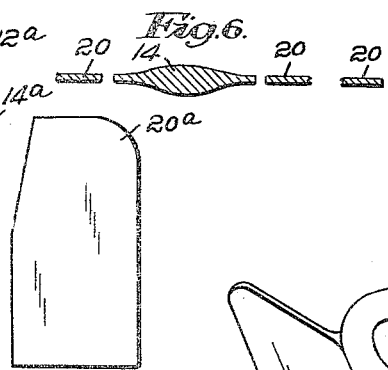
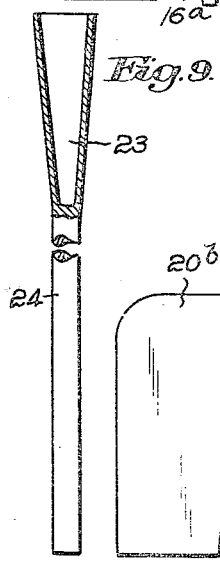
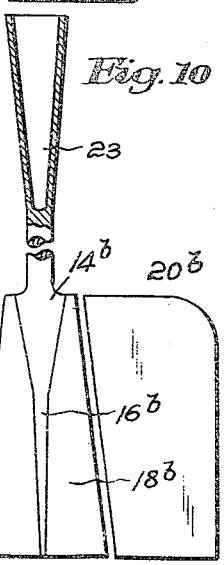
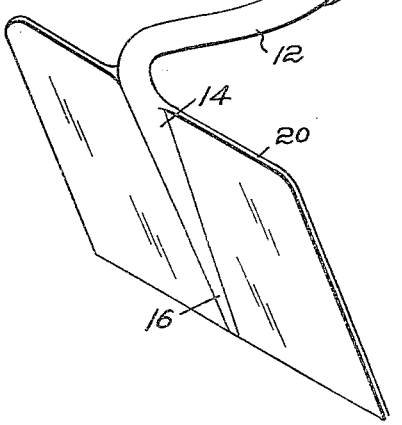
Inventor:
Richard Harte,
by Emery, Booth, Townsend, Miller, Wegner
Attys.

Patented Nov. 5, 1946

2,410,784

UNITED STATES PATENT OFFICE 2,410,784

METHOD OF MAKING TOOL BLADES

Richard Harte, Parkersburg, W. Va., assignor to Ames Baldwin Wyoming Co., Parkersburg, W. Va., a corporation of Delaware Application January 14, 1944, Serial No. 518,300

6 Claims. (Cl. 76—109)

This invention relates to tools of the type having a broad, relatively thin blade or head and a manipulating handle. Garden hoes and shovels are examples and the tools may, for present purposes, be generically termed agricultural tools although obviously not always used for handling arable earth. Coordinate objects of the invention are to provide a strong and simple blade construction for such tools and an inexpensive and rapid method for producing the same.

If we consider, for example, a typical hoe of good quality, it will be seen that the wide body portion of the blade has projecting from the back thereof a stem portion providing for its union with a handle in a joint of the plug and socket type, in the case of the shank type of hoe being the male element or plug, and in the case of the socket type of hoe the female element or socket. At the end of this stem where it joins the blade it merges into a frog by which the broad, thin body of the blade, usually of substantially uniform thickness, is secured. For convenience I shall term this major portion of the blade the "palm," distinguishing it from the frog which forms a part or an integral part of the blade as such. The frog provides a relatively thick portion at the rear of the blade which may be wider than the shank and extends forwardly a substantial distance toward the working edge of the blade, usually tapering in thickness, and is designed to provide a strong connection of the blade to the handle and to distribute the strains of use over a wide area of the palm. In a forged hoe or in a shovel of the solid shank type the palm, frog and handle-attaching stem are forged and rolled from a unitary blank having initially a very slight similarity to the finished article.

With the modern development of fusion welding many proposals have been made to apply it to the manufacture of the blades of agricultural tools. Seam welding has been extensively and practically used for the manufacture of shovels of the plain back type to secure the head of the front strap to the rear face portion of the blade, as was formerly done by the blacksmith's hammer weld. Various proposals for securing together a blade proper or palm to a stem portion by edge to edge butt welding or by arc welding as hitherto made have been found to offer certain difficulties in practice and have not come into general use.

Conventionally in the manufacture of tool blades the main body or palm of the blade has been treated as a unit, either rolled out as a portion of an integral blank or secured as a unit to a stem portion as in the riveted type of hoe or shovel. In departing from this conception I am enabled by utilizing welding to construct in a particularly simple and expeditious manner a strong and simple blade.

My invention will be well understood by reference to the following description taken in connection with the accompanying drawing wherein I have illustrated by way of example certain embodiments thereof as applied to the manufacture of a garden hoe, and wherein:

Fig. 1 is a broken perspective view of a blank;

Fig. 2 is a similar view showing the blank at a later stage;

Fig. 3 shows various parts of the blade collocated adjacent the final position and ready for union;

Fig. 4 is an elevation showing the parts united;

Fig. 5 is a perspective of the completed hoe head with a fragment of the handle;

Figs. 6 and 7 are sections on an enlarged scale on the lines 6—6 and 7—7 of Fig. 3 respectively;

Fig. 8 is a view similar to Fig. 3 showing another modification;

Fig. 9 is a vertical section of another form of blank for forming the central portion of the tool; and Fig. 10 is a view, partly in section, similar to Fig. 3 and showing a collocation of parts including an element formed by operation on the blank of Fig. 9.

In the form of the invention shown in Figs. 1 to 5 I form as a unitary one-piece element a mid-rib comprising a rearwardly projecting stem for union with the handle, a frog and a portion extending forwardly of the frog which in the completed blade constitutes a central portion thereof and which may conveniently be somewhat heavier than the lateral palm-forming portions, and attach thereto such lateral palm-forming portions by welding.

In Fig. 1 I have shown a blank B which may be a mere length of round rod of suitable size and length. This rod is operated on by suitable forging dies to produce the structure $B_1$ shown in Fig. 2. In the present instance a tool of the shank type is provided and the rear portion of the rod B may remain substantially unchanged from its original form as a cylindrical shank 12 of suitable length. Between the ends of the blank B it is forged to provide a frog 14 which is arrowhead-shaped in plan and may be generally lenticular in section, the double convex lens form being shown in Fig. 6, having its greatest thickness at the rear and center and tapering toward the periphery of the arrowhead. Forwardly of the frog the metal is formed into an extension of a length to reach the front edge of the completed blade and this extension may desirably have a forwardly tapering central rib 16 (see Fig. 7) of lesser cross-section than the blade and laterally tapering cheek portions 18 which may be disposed in alignment with the diagonal sides of the frog 14. If necessary, the flash of the forging operation may be trimmed as indicated by dotted lines in Fig. 2 to bring the mid-rib element to the form shown in Fig. 3, presenting straight sides of the parts 18 extending from the point of greatest width of the frog 14. Because the volume of metal is the same at all points, the sides flare outwardly.

The blade is completed by two lateral palm-forming pieces 20 which may be cut from suitable sheet steel and are secured by electric butt welding to the edges of the portions 18 with interfusion and consequent integral union of the parts. Fig. 4 diagrammatically illustrates this by the diagrammatic showing of the transformer T. To complete the tool the shank 12 may, in the case of a hoe as shown, be bent to the goose-neck form of Fig. 5 and its end enters the socket provided in the end of the handle 22.

While in the modification of Figs. 1 to 5 the mid-rib of the hoe is forged from a one-piece blank by a single stroke, it is possible to build it up from separately formed pieces integrally united. Thus in Fig. 8 I have shown a shank 12a and frog 14a as forged from a blank similar to Fig. 1 and have shown disposed in alignment therewith a relatively slender rod-like extension 16a adapted to be united by butt welding to the "point" of the arrowhead, providing an integral structure similar to that shown centrally in Fig. 3. The palm-forming pieces 20a are united to the laterally facing sides of the frog 14a and the sides of the extension 16a as before, but in the example shown they are five-sided to fit, since in that example the portions 18, which in Figs. 2 to 5 extend under the diagonally disposed side portions of the frog 14, are omitted.

In Figs. 9 and 10 I have shown a construction wherein the stem is a female or a socket member into which the end of the handle fits as in the case of a socket hoe. The blank shown in Fig. 9 may be an extrusion having at its rear end a forwardly tapering socket 23, the wall of which tapers rearwardly in thickness, and having an integral rod-like extension 24 at its closed end. In the case of a hoe this extension is of a length to provide the goose-neck in the finished tool and, terminally, metal to form a frog. A structure as shown in Fig. 9 may be produced, if desired, by the method described and illustrated in the patent to Criley 2,054,244. The forward end of the extension 24, the lower end viewing Fig. 9, is then forged to provide the frog 14b and, in the example shown, the forwardly extending rib 16b and lateral portions 18b and corresponding to the parts 14, 16 and 18 in Figs. 2 and 3 and in fact identical therewith as shown, the frog 14b being formed in such relation to the bottom of the socket recess as conditions dictate. The palm-forming pieces 20b are secured to the edges of the parts 18b by electric butt welding as before.

All the parts may be made of high carbon steel and the finished blade will be essentially a one-piece uniform structure. The blank from which the mid-rib is formed is simple and inexpensive, in the case of Figs. 1 to 5 being a mere length of rod adapted to be produced by a rolling mill in indefinite length. The frog and forward end of the mid-rib may be formed by a single stroke of a forging hammer. The palm-forming pieces, as 20, may be cut without waste from sheet steel. In general the finished tool will compare favorably with forged hoes or with so-called solid shank shovels of the prior art shaped laboriously by a long series of operations from a heavy blank. In the form illustrated, where the mid-rib extending from the forward end of the frog to the edge of the blade provides a heavier central zone in the blade tapering to the lateral palm-forming portions. Heretofore shovel blades have been rolled with a heavier portion along the center line. With rolling, however, uniform results could not be attained. Moreover, the increased thickness was not noticeable. By the forging operation here described uniformity is assured. The extension, as 16, may be emphasized to appear as a reduced frog to the edge of the blade which not only is strengthened but looks strong. The parts 18 may provide thickness at the edge for a substantial width particularly when flaring forwardly as shown. Moreover, it will be observed that when they so diverge, the welded joint will be disposed at an angle to ordinary bending strains to which the lateral portions of the blade are subjected in use.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A method of forming a blade for an agricultural or like tool which comprises forging a rod of metal to provide a frog, arrowhead-shaped in plan and generally lenticular in section, and a forward extension therefrom having a thick central portion and tapering sides and of a length to extend to the edge of the finished blade and butt welding the edges of two lateral palm-forming elements respectively to the two sides of said frog and extension.

2. A method of forming a blade for an agricultural or like tool which comprises forging a metallic rod to provide between its ends a frog arrowhead-shaped in plan and from the end of the rod forwardly of the frog an extension of reduced thickness relatively to the frog having laterally presented sides diverging forwardly from the point of maximum width of the frog, the extension being of a length to extend to the edge of the finished blade and butt welding the edges of two lateral palm-forming elements respectively to the two sides of said frog and extension.

3. A method of forming a blade for an agricultural or like tool which comprises forging the end of a piece of generally cylindrical contour to provide a frog arrowhead-shaped in plan, butt welding thereto an extension of a length to extend to the edge of the finished blade and butt welding the edges of two lateral palm-forming elements respectively to the two sides of the frog and extension.

4. A method of forming a blade for an agricultural or like tool which comprises die forging by a single operation a metal rod of uniform cross-section to reshape the metal thereof into a frog, arrowhead-shaped in plan and generally lenticular in section, and a narrow integral forward extension therefrom of a length to extend to the edge of the finished blade to provide a central mid-rib therefor and then butt welding the edges of two lateral palm-forming elements respectively to the two sides of said frog and extension, which elements collectively provide the major portion of the width of the blade.

5. A method of forming a blade for an agricultural or like tool which comprises forming a tubular handle-receiving socket having a slender rod of uniform cross-section extending therefrom, die forging the rod by a single operation to reshape the material thereof into a unit integral with the socket and comprising a frog, arrowhead-shaped in plan and generally lenticular in section, and an integral forward extension therefrom of a length to extend to the edge of the finished blade and then butt welding the edges of two lateral palm-forming elements respectively to the two sides of said frog and extension, which elements collectively provide the major portion of the width of the blade.

6. A method of forming a blade for an agricultural or like tool which comprises die forging by a single operation a metallic rod of substantially uniform cross-section to provide between its ends a frog, arrowhead-shaped in plan, and also from the end of the rod forwardly of the frog an integral reduced section of a length to extend to the edge of the finished blade and then butt welding the edges of two lateral palm-forming elements respectively to the two sides of said frog and extension, which elements collectively provide the major portion of the width of the blade.

RICHARD HARTE.